United States Patent [19]

Kuyper et al.

[11] Patent Number: 4,472,560
[45] Date of Patent: Sep. 18, 1984

[54] PROCESS FOR THE POLYMERIZATION OF EPOXIDES

[75] Inventors: Jan Kuyper; Paulina van Schaik-Struykenkamp, both of Amsterdam, Netherlands

[73] Assignee: Shell Oil Company, Houston, Tex.

[21] Appl. No.: 480,187

[22] Filed: Mar. 29, 1983

[30] Foreign Application Priority Data

Mar. 31, 1982 [GB] United Kingdom ................. 8209455

[51] Int. Cl.$^3$ ....................... C08G 65/10; C08G 65/14
[52] U.S. Cl. .................................... 526/120; 526/113; 526/117; 528/92; 528/410; 528/411; 528/412; 568/620
[58] Field of Search ................. 528/92, 410, 411, 412; 526/93, 113, 117, 120, 123, 137, 138, 160; 568/620

[56] References Cited

U.S. PATENT DOCUMENTS

| 3,404,109 | 10/1968 | Milgrom | 528/76 X |
| 3,427,256 | 2/1969 | Milgrom | 528/412 X |
| 3,427,334 | 2/1969 | Belner | 528/412 X |
| 3,427,335 | 2/1969 | Herold | 528/412 X |
| 3,941,849 | 3/1976 | Herold | 528/102 X |

Primary Examiner—Earl A. Nielsen
Attorney, Agent, or Firm—Norris E. Faringer

[57] ABSTRACT

A process for the polymerization of epoxides using as catalyst a double metal cyanide-type compound is described wherein said process is carried out in the presence of at least (a) one or more salts composed of at least bivalent metal ions and metal-free anions, having a solubility in water of at least 1 g/100 ml at 25° C., and/or
(b) one or more non-metal containing acids of which a 0.1 N solution in water at 25° C. has a pH not exceeding 3.

18 Claims, No Drawings and EPOXIDES

FIELD OF THE INVENTION

The present invention relates to an improved process for the polymerization of epoxides.

BACKGROUND OF THE INVENTION

The polymerization of epoxides such as propylene oxide or mixtures of propylene oxide and ethylene oxide using water and/or alcohols as initiators is of great industrial importance since the resulting polyether alcohols or polyether polyols are very versatile compounds which can be used as such or as intermediates in the manufacture of various products such as (flexible) polyurethanes, detergents, oil additives and brake fluids.

The polymerization of epoxides is normally carried out under basic conditions, e.g., by using potassium hydroxide or sodium hydroxide as a catalyst. Although products (polyether polyols or polyether alcohols) of good quality can be obtained, the use of these inorganic bases limits the capacity of the process since a long batch time is required to warrant good quality products. Shortening of the batch time is not impossible but it has the intrinsic disadvantage that the selectivity of the process is decreased substantially which seriously affects the product properties.

Therefore, alternative catalytic systems, allowing in principle a shorter batch time, have been suggested. Reference is made to double metal cyanide complexes such as disclosed in British Pat. No. 1,149,726 (for instance zinc hexacyanometallate-complexes further containing zinc chloride, water and an organic ligand) and in East German Pat. No. 148,957 (specifically metal hexacyano iridium complexes further containing chloride, water and an ether).

As the preparation of such double metal cyanide complexes is rather complicated and tedious, in copending application Ser. No. 475,018, filed Mar. 14, 1983, a novel class of double metal cyanide complexes is described and claimed, which catalysts can be prepared without any of the major handling problems normally encountered in the preparation of double metal cyanide complexes. Moreover, this class of novel double metal cyanide complexes appears to be stable, both as such and in admixture with the appropriate initiator. The catalytic activity of these novel double metal cyanide complexes is at least on a par with the activity of the double metal cyanide catalysts known in the art. Although the yields, expressed in kg polyether polyol or polyether alcohol/g catalyst are reasonable, any improvement in the yield is still highly desirable since this would contribute substantially to the feasibility of the polymerization process.

It has now surprisingly been found that the presence of certain promoters as defined hereinafter, has a very beneficial influence on the yields of polyether polyols prepared using catalysts based on double metal cyanide complexes. Yield increases as high as 100% or even higher can be obtained under otherwise identical reaction conditions.

SUMMARY OF THE INVENTION

The present invention therefore relates to a process for the polymerization of epoxides using as catalysts double metal cyanide-type compounds whereby the process is carried out in the presence of at least (a) one or more salts composed of at least bivalent metal ions and metal-free anions, having a solubility in water of at least 1 g/100 ml at 25° C., and/or (b) one or more non-metal containing acids of which a 0.1N solution in water at 25° C. has a pH not exceeding 3.

DESCRIPTION OF THE PREFERRED EMBODIMENTS

The present invention relates, in particular, to a process for the polymerization of epoxides using double metal cyanide type compounds in the presence of one or more salts composed of at least bivalent metal ions and metal-free anions, having a solubility in water of at least 1 g/100 ml at 25° C. Preference is given to the use of hexafluorosilicates and sulfates.

It should be noted that the salts as defined hereinbefore do not exert any significant catalytic activity themselves in the polymerization of propylene oxide under normal conditions. However, in combination with double metal cyanide-type compounds, they perform a remarkable promoting activity. Without wishing to be bound to any particular theory, it is thought that these promoters are capable of depressing or delaying the deactivation of the double metal cyanide-type catalysts which normally occurs during the polymerization reaction.

Suitable salts having oxygen-containing metal-free anions comprise salts of the following polyvalent metal ions: Ce(IV), Co(II), Sn(IV), $VO^{2+}$, Cu(II), $Mg^{2+}$, $Al^{3+}$, Zn(II), Th(IV), Fe(III) and $TiO^{2+}$. In case the salts are added as solids to the reaction mixture preference is given to the use of hydrated salts, in particular hydrated sulfates. It has been found that hydrated salts are in particular beneficial in the presence of the double metal cyanide-type catalysts as claimed in copending application (K-0441 US) referred to hereinbefore, i.e., in the presence of catalysts containing a certain amount of acid in the total composition.

Examples of (hydrated) salts which can be suitably used as promoters in the process according to the present invention comprise cerium(IV) sulfate (tetrahydrate), cobalt(II) sulfate (heptahydrate), tin(IV) sulfate (dihydrate), copper(II) sulfate (pentahydrate), magnesium sulfate (heptahydrate), aluminum sulfate (octadecahydrate), zinc sulfate (heptahydrate), thorium(IV) nitrate (tetrahydrate) as well as other zinc salts/(hydrates) such as zinc ortho-arsenate, zinc hydroorthoarsenate (tetrahydrate) and zinc selenate (pentahydrate). Preference is given to the use of (hydrated) salts as promoters which contain a similar cation as one of the metal ions of the double metal salt cyanide catalysts. In particular, when zinc hexacyano metallates are used, preference is given to the use of zinc salts, such as zinc sulfate (hepta-hydrate). It will be clear that salts containing less water of hydration than indicated hereinbefore or which contain other lattice molecules (e.g. alcohols, ketones or ethers) can also be used conveniently.

Salts composed of at least bivalent metal ions and metal-free polyhalo-anions having a solubility in water of at least 1 g/100 ml at 25° C. such as (the hydrates of) hexafluoro silicates, hexafluoro phosphates and tetrafluoro borates can also be used advantageously. Examples of such salts comprise zinc hexafluorosilicate, magnesium hexafluorosilicate, zinc hexafluoro phosphate, zinc tetrafluoro borate and magnesium tetrafluoro borate. Preference is given to the use of hexafluoro silicates and tetrafluoro borates.

Examples of acids of which a 0.1N solution in water at 25° C. has a pH not exceeding 3 which can be used suitably in the process according to the present invention comprise inorganic acids such as hydrochloric acid, hydrobromic acid, nitric acid, phosphoric acid and sulfuric acid as well as organic acids such as the chloroacetic acids, the fluoroacetic acids, benzene sulphonic acid, naphthalene sulphonic acid, oxalic acid and maleic acid. Preference is given to the use of inorganic acids, in particular hydrochloric acid, hydrobromic acid, phosphoric acid, and preferably, sulphuric acid.

It has been found that very good results can be obtained when use is made of at least two promoters, in particular when use is made of one or more salts composed of at least bivalent metal ions and oxygen-containing metal-free anions, having a solubility in water of at least 1 g/100 ml at 25° C. together with an acid as defined hereinbefore, in particular hydrochloric acid, hydrobromic acid, phosphoric acid or sulfuric acid. Preference is given to the use of promoter combinations based on the zinc salts, in particular zinc sulfate (heptahydrate) and hydrochloric acid or sulfuric acid.

It should be noted that metal-containing acids such as chromic acid and permanganic acid have an unfavorable impact on the activity of double metal cyanide-type catalysts.

The amount of promoter(s) to be applied is not critical and may vary between wide limits. Good results can be obtained using a double metal cyanide-type catalyst and one or more compounds (a) and/or (b) in a molar ratio in the range of from 10 to 0.1, preferably in the range of from 4 to 0.2.

The process according to the present invention can be carried out using double metal salt cyanide complexes as described in the art, e.g., as described in British Pat. No. 1,149,726 and East German Pat. No. 148,957. Very good results can be obtained using double metal salt cyanide complexes as described and claimed in copending application Ser. No. 475,018, filed Mar. 14, 1983, which complexes can be represented by the general formula $$M^1{}_a[M^2(CN)_b(A)_c]_d \cdot wM^3D_e \cdot xH_2O \cdot yL \cdot zH_nE_m \qquad (I)$$

wherein $M^1$ represents at least one of Zn(II), Fe(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ or $M^2$; A, D and E each represent an anion which may be the same or different; L represents an alcohol, aldehyde ketone, ether, ester, amide, nitrile or sulfide or mixtures thereof; a and d are numbers to satisfy the valency state of $M^1$ and $M^2$ in the double metal cyanide part of the general formula I; b and c are integers (b>c) which together with a and d provide the electroneutrality of the double metal cyanide part of the general formula I; e is an integer satisfying the valency state of $M^3$; n and m are integers satisfying the electroneutrality of HE and w is a number between 0.1 and 4;
x is a number up to 20;
y is a number between 0.1 and 6; and
z is a number up to 5.

Preference is given to the use of compounds according to the general formula $$Zn_3[Co(CN)_6]_2 \cdot wM^3X_2 \cdot xH_2O \cdot yL \cdot zHX \qquad (II)$$

wherein X represents a halide; $M^3$ represents Zn(II), Co(II) or Fe(II); L represents an alcohol, ether or ester;
w is a number between 0.7 and 1.5;
x is a number between 2 and 10;
y is a number between 1.5 and 3; and
z is a number between 0.15 and 1.5.

Examples of various organic ligands L as well as of acids according to the general formula $H_nE_m$ can be found in copending application Ser. No. 475,018, filed Mar. 14, 1983 which is included herein by way of reference.

The catalysts according to the general formula I can be suitably prepared by reacting a compound according to the general formula $$M^1{}_2[M^2(CN)_b(A)_c]_d \cdot xH_2O \cdot pM^1(OH)_q \qquad (III)$$

wherein $M^1$, $M^2$, a, b, c, d and x are as defined hereinbefore; p is a number between 0.1 and 4 and q is an integer satisfying the valency state of $M^1$ with at least the stoichiometric amount required for converting the hydroxyl groups present of a compound $H_nE_m$, wherein H, E, n and m are as defined hereinbefore, preferably in the presence of water and/or an organic ligand L as defined hereinbefore, if desired after a heat treatment. It should be noted that the groups $M^1$ in formula III may represent different metals.

In particular, use is made of catalysts according to the general formula II which can be prepared by reacting compounds according to the general formula $$Zn_3[Co(CN)_6]_2 \cdot xH_2O \cdot pZn(OH)_2 \qquad (IV)$$

wherein x and p are as defined hereinbefore with at least, and preferably more of the stoichiometric amount required for converting the hydroxyl groups present of an inorganic acid $H_nX_m$ wherein X, n and m are as defined hereinbefore, preferably in the presence of water and/or an appropriate organic ligand L as defined hereinbefore, if desired after a heat treatment. When more than the amount of the compound $H_nE_m$ (or $H_nX_m$) required stoichiometrically to convert the hydroxyl group present in compounds according to the general formula III (or IV) is used, a catalyst will be obtained which contain a certain amount of $H_nE_m$. It has been found that the presence of this compound (e.g. by starting with hydrogen halides in a 1–3 molar excess) has a marked influence on the viscosity of the catalyst complex suspension, both in the presence and in the absence of an initiator, which normally enhances handling procedures.

The preparation of the catalysts is normally carried out by suspending a compound according to the general formula III or IV, if desired after a heat treatment, in a mixture $H_2O$/L or in pure L. Good results can be obtained using ethers, in particular dimethoxy ethane, as the organic compound, but other ligands can also be used, preference is given to mixtures comprising more than 50%w, in particular between 60 and 95%w of organic compound.

In the event that the catalyst also comprises a compound $H_nE_m$, this compound can be added as such, or as a solution of the appropriate acid in the concentration desired, in a convenient solvent. Normally, the amount of acid desired is introduced in water and/or a compound L with stirring into the suspension of the double metal cyanide-metal hydroxide complex. The reaction mixture obtained is normally stirred for a number of hours. Without any filtration or centrifugation after evaporation of volatile compounds a solid containing $H_nE_m$ is obtained which can be used as such or can be stored. The suspension obtained may also be mixed with an appropriate initiator and used as such or after removal of at least part of the volatile compounds. Initiator-catalyst suspensions thus obtained are stable and active for at least half a year at room temperature. The use of non-volatile acids such as sulphuric acid is advantageous in that they reduce the viscosity of the resulting suspension, which facilitates its handling.

The compounds according to the general formula III or IV may be subjected to a heat treatment during or after their preparation, prior to reacting them with a compound $H_nE_m$ in the presence of water and/or an organic compound L. Without wishing to be bound to any particular theory it would appear that the double metal cyanide-metal hydroxide complex is converted into a double metal cyanide hydroxide complex. It should be noted that such double metal cyanide hydroxide complexes can also be obtained by reacting solid double metal cyanide (or a hydrate thereof) with $M^1(OH)_2$, preferably in suspension, followed by a heat treatment.

The heat treatment will normally be carried out at temperatures between 40° C. and 120° C., preferably between 50° C. and 90° C. The treatment is particularly effective when the double metal cyanide-metal hydroxide complex has been obtained starting from alkali hexacyano metallates since the alkali salt co-produced can be removed quite easily, e.g., by an extremely rapid filtration or decantation without undue incorporation into the final catalyst. This is important since alkali ions, in particular sodium and potassium ions act as catalyst poison in polymerization reactions of epoxides using double metal cyanide-type catalysts. Moreover, the product obtained after drying is easily reduced to a free-flowing powder which can be handled smoothly.

The compounds according to the general formulae III and IV can be prepared by methods known in the art. Focusing for the sake of simplicity on the preparation of zinc hexacyano cobaltate-type catalysts, a suitable method comprises the addition of an alkali(ne) earth hexacyano cobaltate to an aqueous solution of an appropriate zinc salt, such as zinc chloride or zinc sulfate using such an amount thereof that the subsequent addition of a base, preferably an alkali(ne earth) metal hydroxide or ammonium hydroxide causes the formation of the desired metal hydroxide complex.

When compounds according to the general formula III are to be prepared wherein $M^1=M^3=Zn$, a preferred method comprises the addition of the starting alkali(ne earth) hexacyano metallate to an excess of the zinc salt, if desired together with the appropriate amount of the (inorganic) base. The order of addition is less critical when the reaction product is submitted to a heat treatment. It has been found that good results can be obtained when the compound $M^3D_e$ is used in such an amount that a molar ratio $M^1a[M^2(CN)_b(A)_c]_d:M^3D_e$ between 0.1 and 4, preferably between 0.7 and 1.5, is obtained in the catalyst according to the general formula I.

Normally, double metal cyanides such as zinc hexacyano cobaltate will be prepared starting from easily available alkali(ne earth) hexacyano cobaltates, e.g. potassium hexacyano cobaltate or from the corresponding acid. A problem encountered when using such compounds is the presence of potassium ions which have to be removed during the working-up procedure since potassium ions have a tendency to poison the catalyst. A number of washings/filtrations has to be applied to reduce the potassium content to an acceptable level. It has been found that calcium hexacyano cobaltate is a very good starting material for double metal cyanides especially when zinc sulfate is used as the compound to introduce the zinc moiety into the double metal cyanide since insoluble calcium sulfate is coproduced which can be removed without difficulty from the polymerization product. Filtration was not required as calcium sulfate does not poison the catalyst. The use of calcium hexacyano cobaltate is moreover advantageous in that a catalyst mixture containing also one or more promoters can be prepared in one step. Thus, the process according to the present invention can be carried out advantageously when use is made of a catalyst (in the presence of compounds a and/or b) which has been obtained using calcium hexacyano cobaltate as starting material. It may be advantageous to start from aluminum hexacyano cobaltate or magnesium hexacyano cobaltate since conversion with zinc sulfate and an inorganic acid, e.g., hydrochloric acid, leads to the formation of a catalyst/promoter(s) combination in a single operation.

Examples of epoxides which can be suitably used as starting materials in the process according to the present invention comprise 1,2-epoxides and 1,3-epoxides (oxetanes) such as ethylene oxide, 1,2-propylene oxide, epichlorohydrin, 1,2-butene oxide, 4-chloro-1,2-butene oxide, 1,2-hexene oxide, 1,2-dodecene oxide, isobutylene oxide, styrene oxide, 1,2-pentene oxide, isopentene oxide, 1,2-heptene oxide, methyl glycidyl ether, ethyl glycidyl ether, allyl glycidyl ether, phenyl glycidyl ether, butadiene monoxide, isoprene monoxide, 1,3-propylene oxide, tolyl glycidyl ether, 3,3-dimethyl oxetane and 3-vinyl-3-methyl oxetane. Preference is given to the use of lower alkylene oxides such as ethylene oxide, 1,2-propylene oxide, butylene oxide, butadiene monoxide, methyl glycidyl ether and phenyl glycidyl ether, in particular 1,2-propylene oxide. Mixtures of epoxides, in particular mixtures of propylene oxide and other epoxides, such as ethylene oxide can also be applied. If desired, the epoxide(s) may be added to the reaction mixture in more than one stage. The amounts of the various epoxides to be used can vary widely according to specific end use and can be easily determined by those skilled in the art.

Preference is given to the use of at least one or more initiators in the process for the polymerization of epoxides according to the present invention. As stated hereinbefore, at least part of the initiator may already be present in the catalyst suspension to be applied because of the unusual stability of the catalyst/initiator suspension containing one or more compounds according to the general formula I. It is of course also possible to add the appropriate amount of an initiator to a solid catalyst or a catalyst suspension prior to the reaction or to add a solid catalyst or a catalyst suspension to one or more epoxides or an epoxide(s)/initiator mixture.

Examples of initiators which can be suitably applied comprise: water; alkanols, such as methanol, ethanol, propanol, butanol and hexanol, thiols such as butane thiol; glycols such as propylene glycol and polyO propylene glycol; glycol monoalkyl ethers such as mono(m-)ethoxy ethylene glycol; aromatic hydroxy compounds such as phenol, the cresols and diphenylol propane, trimethylol propane, pentaerythritol, carboxylic acids or anhydrides such as fumaric acid, maleic acid and phthalic acid as well as the corresponding low-molecular weight alkoxylated products, e.g. compounds having a molecular weight between 200 and 2000, preferably based on propylene oxide and a lower polyalkanol such as glycol or glycerol, i.e. a propoxylated glycerol. Preference is given to the use of butanol and in particular propoxylated glycerols.

Therefore, the present invention also relates to catalyst suspensions containing at least a compound according to the general formula I, one or more salts composed of at least bivalent metal ions and metal-free anions, preferably oxygen-containing metal-free anions having a solubility in water of at least 1 g/100 ml at 25° C. and/or one or more acids as defined hereinbefore and preferably at least one initiator. The present invention relates in particular to catalyst suspensions containing at least a compound according to the general formula II, one or more salts composed of at least bivalent metal ions and metal-free anions, preferably oxygen-containing metal-free anions having a solubility in water of at least 1 g/100 ml at 25° C. and/or one or more acids as defined hereinbefore and preferably at least one initiator, which is preferably a polyalkanol.

The molar ratio of epoxide(s) and initiator applied is not very critical and may vary between wide limits. Good results can be obtained using a molar ratio in the range between 3000 and 0.5, calculated as number of moles of epoxide(s) per hydroxyl group. Preference is given to the use of molar ratios in the range between 60 and 10, calculated as number of moles of epoxide(s) per hydroxyl group.

The amount of catalyst used in the process for the polymerization of epoxides according to the present invention is not very critical and may vary between wide limits. Suitably the amount of catalyst is within the range of from 0.01 to 15%w of the initiator applied, and preferably within the range of from 0.05 to 5%w thereof.

The promoters to be applied in the process for the polymerization of epoxides using double metal cyanide-type compounds may be present in the solid catalyst or in the catalyst suspension, whether or not in the additional presence of an initiator. The promoter(s) may also be added to the catalyst (suspension) during the polymerization process. Good results have been obtained when the promoter(s) were added as powdered solid(s) to the catalyst/initiator mixture in the reactor. Preference is given to the use of catalyst suspensions already containing the promoter(s).

The polymerization of epoxides using a catalyst according to the general formula I in the presence of one or more compounds a and/or b and, optionally in the presence of an initiator, can be carried out using methods described in the literature. Temperatures between 20° and 180° C., preferably between 80° and 140° C., are suitably employed, while pressures up to 10 bar or more may be used. The use of higher temperatures is advantageous in that it increases the reactivity without significantly reducing the selectivity. The amount of epoxide(s) to be used in the process according to the present invention is usually selected so as to be sufficient for the formation of a polyether polyol, or a mixture thereof, having the desired molecular weight and functionality as determined by the initiator.

After the reaction has reached the desired stage, the polyether alcohols or polyether polyols formed may be collected without further treatment or, if desired, purified, e.g. by treatment with active carbon or natural or synthetic absorbent earths, followed by filtration. It will be clear that numerous other substances may be added before, during and/or after the reaction.

The polyether polyols obtained can be further modified by methods known to those skilled in the art, e.g., producing either an OH— or isocyanate-terminated prepolymer by reacting them with the appropriate amount of (poly)isocyanate, or producing polymer polyols, or producing a more reactive polyol by modifying the end groups of the polyol to primary OH— or NH-groups.

Polyether polyols obtained in the process according to the present invention whether or not containing catalyst residues show a normal reactivity with respect to isocyanates and are particularly suitable for the production of flexible polyurethanes in accordance with the general methods described in the literature. For instance, the polyether polyols, possibly admixed with other active hydrogen atoms-containing compounds, can be reacted conveniently with organic polyisocyanates such as toluene diisocyanate or diphenylmethane-4,4'-diisocyanate, if desired in the presence of other substances, such as foaming agents, surface-active agents, anti-oxidants, flame-retarding agents and other additives known in the art.

In accordance with the above, the present invention also relates to polyether alcohols and/or polyether polyols manufactured by the process as described hereinbefore, the production of polyurethanes by reacting said polyether polyols with (poly)isocyanates, and (poly)urethanes so produced.

The invention is illustrated by the following illustrative embodiments (examples). Unless otherwise stated parts and percentages are by weight.

PREPARATION OF DOUBLE METAL CYANIDE CATALYSTS

Zinc hexacyano cobaltate-type catalysts having the general formula

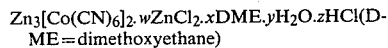

$$Zn_3[Co(CN)_6]_2 \cdot wZnCl_2 \cdot xDME \cdot yH_2O \cdot zHCl \text{ (DME = dimethoxyethane)}$$

wherein w, x, y and z have meanings as defined hereinbefore and specified hereinafter, were prepared according to the following method (I): An industrial solution of potassium hexacyano cobaltate (110 g, ex Degussa, containing about 12.4%w of the salt) was diluted with water to a volume of 150 ml. This solution was added under rapid stirring to a solution of 11 g of zinc chloride in 150 ml $H_2O$. The precipitate formed was collected on a filter and the wet cake obtained was reslurried with water. This process was repeated several times. The final wet cake (44 g) of $Zn_2[Co(CN)_6]_2 \cdot 12-14\ H_2O$ was then mixed with dimethoxyethane (DME, 150 ml) and stirred until complete suspension. To 43.5 g of this suspension was added a mixture of 0.6 g zinc chloride, 0.7 ml concentrated hydrochloric acid, 4 ml $H_2O$ and 4 ml DME under stirring. Part of the suspension was dried to give a solid catalyst having an approximate composition according to elemental analysis of 2 DME, 1 HCl and 6.5 $H_2O$ per mole of $Zn_3[Co(CN)_6]_2 \cdot ZnCl_2$. After 4 days 40.6 g of this mixture was mixed with 91.8 g of a propoxylated glycerol having an average molecular weight of about 300 in a rotating evaporator. After removal of about 35 g volatiles at 55° C. under reduced pressure a stable catalyst suspension was obtained containing 3.6%w of catalyst in the propoxylated glycerol.

POLYMERIZATION EXPERIMENTS

Polymerization experiments were carried out (unless described differently hereinafter) in a 2.5-liter reactor provided with means of agitation and heat exchange. The reactor was flushed with nitrogen and charged with about 0.5 mole of a propoxylated glycerol having an average molecular weight of 300 and 0.20 g catalyst per mole of OH— initiator applied. The reactor was evacuated at 90° C. for a few minutes and flushed again with nitrogen. About two moles of a mixture of propylene oxide and ethylene oxide (containing 11%w of ethylene oxide) was pumped into the reactor and the temperature was increased to 95° C. After an induction period of about 10 minutes the reaction started, as was observed from heat evolution and pressure drop. After most of the initial epoxide mixture had reacted away, a mixture of propylene oxide and ethylene oxide (containing 11%w of ethylene oxide) was fed to the reactor in such a way as to maintain a pressure of 3 bar while the temperature was raised to 110°–120° C. The addition was continued until the rate of reaction dropped to less than 1/10 of the maximum. If and when necessary, part of the reactor content can be discharged so as to allow space for more epoxide.

EXAMPLE 1

The polymerization of the PO/EO mixture was carried out using a catalyst suspension prepared according to method I in the propoxylated glycerol referred to hereinbefore. Titanyl sulphate dihydrate was used as promoter in an amount of 133 mg per mole of OH— initiator and was added directly to the reactor. The concentration of the catalyst amounted to 200 mg per mole of OH— initiator. Polyether polyol was obtained in a yield, calculated per gram of catalyst, of 11.9 kg.

A similar polymerization experiment was carried out in the absence of the titanyl sulfate promoter. The yield of polyether polyol, calculated per gram of catalyst, amounted to 5.6 kg.

EXAMPLE 2

The experiment described in Example 1 was repeated using 133 mg cerium(IV) sulfate tetrahydrate per mole of OH— initiator. Polyether polyol was obtained in a yield, calculated per gram of catalyst, of 10.1 kg. When a similar experiment was carried out in the absence of the cerium salt, polyether polyol was obtained in a yield of 5.3 kg.

EXAMPLE 3

The experiment described in Example 1 was repeated using 133 mg tin(IV) sulfate dihydrate per mole of OH— initiator. Polyether polyol was obtained in a yield, calculated per gram of catalyst, of 8.9 kg. When a similar experiment was carried out in the absence of the tin salt, polyether polyol was obtained in a yield of 5.6 kg.

EXAMPLE 4

The experiment described in Example 1 was repeated using 133 mg of hydrated vanadyl sulfate per mole of OH— initiator. Polyether polyol was obtained in a yield, calculated per gram of catalyst, of 8.2 kg. When a similar experiment was carried out but omitting the presence of the vanadyl sulfate, polyether polyol was obtained in a yield of 5.3 kg.

EXAMPLE 5

The experiment described in Example 1 was repeated using 133 mg of copper(II) sulfate pentahydrate per mole of OH— initiator. Polyether polyol was obtained in a yield, calculated per gram of catalyst, of 7.2 kg. When a similar experiment was carried out but omitting the presence of the copper sulfate, polyether polyol was obtained in a yield of 5.3 kg.

EXAMPLE 6

The experiment described in Example 1 was repeated using zinc sulfate heptahydrate as promoter. This compound had been added to the catalyst suspension in DME/H$_2$O directly after the addition of HCl (molar ratio catalyst:promoter 1:1). The catalyst was used in an amount of 100 mg per mole of OH— initiator. Polyether polyol was obtained in a yield, calculated per gram of catalyst, of 12.7 kg.

EXAMPLE 7

The experiment described in Example 6 was repeated using magnesium sulfate heptahydrate as promoter. This compound was present in the catalyst suspension in a molar ratio catalyst:promoter 1:1. Polyether polyol was obtained in a yield, calculated per gram of catalyst, of 12.0 kg.

EXAMPLE 8

The experiment described in Example 6 was repeated using cerium(IV) sulfate tetrahydrate as promoter. This compound was present in the catalyst suspension in a molar ratio catalyst:promoter 1:1. Polyether polyol was obtained in a yield, calculated per gram of catalyst, of 11.9 kg.

EXAMPLE 9

The experiment described in Example 6 was repeated using aluminum sulfate octadecahydrate as promoter. This compound was present in the catalyst suspension in a molar ratio catalyst:promoter 1:1. Polyether polyol was obtained in a yield, calculated per gram of catalyst, of 11.0 kg.

EXAMPLE 10

The experiment described in Example 6 was repeated using sulfuric acid as promoter. This compound was present in the catalyst suspension in a molar ratio catalyst:promoter 1:1. Polyether polyol was obtained in a yield, calculated per gram of catalyst, of 10.2 kg. When an experiment as described in Examples 6–10 was carried out in the absence of any promoter under otherwise similar conditions, the amount of polyether polyol obtained, calculated per gram of catalyst, was 5.5 kg. The catalyst/promoter suspensions as described in the Examples 6–10 were used in the polymerization experiments half a year after their preparation (having been stored at room temperature).

EXAMPLE 11

The experiment described in Example 1 was repeated using magnesium hexafluorosilicate hexahydrate as promoter. This compound was used in an amount of 133 mg per mole of OH— initiator (molar ratio catalyst:promoter 0.4). Polyether polyol was obtained in a yield, calculated per gram of catalyst, of 8.3 kg.

EXAMPLE 12

The experiment described in Example 11 was repeated using zinc tetrafluoro borate hydrate as promoter. This compound was used in an amount of 133 mg per mole of OH— initiator (molar ratio catalyst:promoter 0.6). Polyether polyol was obtained in a yield, calculated per gram of catalyst, of 6.5 kg.

EXAMPLE 13

The experiment described in Example 6 was repeated using zinc chloride and phosphoric acid as promoter. The compounds were present in the catalyst suspension (molar ratio catalyst:$ZnCl_2$:$H_3PO_4$ 1:1:1). Polyether polyol was obtained in a yield, calculated per gram of catalyst, of 8.0 kg.

EXAMPLE 14

The experiment described in Example 6 was repeated using zinc sulfate heptahydrate as promoter (molar ratio catalyst:promoter 1:1). The catalyst was used in an amount of 200 mg per gram of OH— initiator. Polyether polyol was obtained in a yield, calculated per gram of catalyst, of 14.6 kg. When this experiment was repeated in the absence of the promoter, the yield of polyether polyol, calculated per gram of catalyst, amounted to 5.5 kg.

EXAMPLE 15

A number of experiments were carried out using zinc sulfate heptahydrate as promoter in different catalyst:promoter ratios. The results are given in Table I.

TABLE I

| promoter mg/mole-OH-initiator | molar ratio catalyst; promoter | yield kg per g cat. |
| --- | --- | --- |
| 22 | 2.5 | 10.5 |
| 43 | 1.25 | 13.0 |
| 65 | 0.8 | 14.5 |
| 108* | 0.5 | 14.7 |

*Some precipitation of promoter observed

EXAMPLE 16

From the same batch of $Zn_3[Co(CN)_6]_2 \cdot 12$–$14\ H_2O$, prepared according to method I, four different catalyst suspensions were prepared containing no promoter (A), zinc sulfate (B), hydrochloric acid (C) and zinc sulfate/hydrochloric acid (D). The catalyst suspensions were prepared by stirring into a water/dimethoxy ethane mixture the following ingredients:

zinc hexacyano cobaltate (I) and zinc chloride (II) in a 1:1 molar ratio (A);

I and II and zinc sulfate heptahydrate (III) in a 1:0.9:0.3 molar ratio (B);

I and II and hydrochloric acid (IV) in a 1:1:2 molar ratio (C) and

I, II, III and IV in a 1:0.9:0.3:2 molar ratio (D).

The final catalyst suspensions in the propoxylated glycerol were obtained by allowing evaporation of volatile components under reduced pressure. The polymerization experiments were carried out under standard conditions using a propoxylated glycerol having an average molecular weight of 300 as initiator as described hereinbefore. The results are given in Table II.

TABLE II

| catalyst | promoter | yield kg/g cat |
| --- | --- | --- |
| A | — | 3.1 |
| B | $ZnSO_4$ | 4.3 |
| C | HCl | 5.8 |
| D | $ZnSO_4$/HCl | 9.8 |

It will be clear from the data given in Table II that the combination of a group A (zinc sulfate) and a group B (hydrochloric acid) promoter causes a marked improvement with respect to the yield of polyether polyol compared with the use of either A or B as promoter, which in their turn exhibit a distinct improvement over the non-promoted catalyst (A).

EXAMPLE 17

A catalyst was prepared starting from calcium hexacyano cobaltate which has the advantage that no filtration is necessary in the catalyst preparation. The catalyst was prepared by adding together under stirring in a water/dimethoxyethane mixture:calcium hexacyano cobaltate, zinc sulfate heptahydrate, zinc chloride and hydrochloric acid in a 1:3.3:0.9:1 molar ratio. The highly stable suspension obtained was mixed with a propoxylated glycerol having an average molecular weight of 300, followed by removal of volatiles under reduced pressure at 50°–60° C. A polymerization experiment was carried out under standard conditions (the catalyst suspension still containing co-produced calcium sulfate). Polyether polyol was obtained in a yield, calculated per gram of catalyst, of 10 kg. calcium sulfate was effectively removed from the polyol by a simple filtration.

EXAMPLE 18

A polymerization experiment was carried out using the catalyst and promoter of Example 14 in an amount of 0.05 g catalyst per mole of OH— initiator. In this experiment 5 g butanol-1 was used as initiator, thus giving a polyether as reaction product.

The polymerization was carried out at 90° C. using toluene as solvent (70 g) and about 105 g of propylene oxide. The yield of polyether, calculated per gram of catalyst, amounted to 25.5 kg. When the experiment was repeated using butanol-2 as initiator and a catalyst suspension also containing sulfuric acid (in a zinc sulfate:sulfuric acid molar ratio of 2:1) a polyether yield, calculated per gram of catalyst, of 27 kg was obtained.

What is claimed is:

1. A process for the polymerization of epoxides in the presence of a (1) double metal salt cyanide-complex catalyst of the general formula:

$$M^1{}_a[M^2(CN)_b(A)_c]_d \cdot wM^3D_e \cdot xH_2O \cdot yL \cdot zH_nE_m$$

wherein $M^1$ represents at least one of Zn(II), Fe(II), Co(II), Ni(II), Mn(II), Cu(II), Sn(II) or Pb(II); $M^2$ represents at least one of Fe(II), Fe(III), Co(III), Cr(III), Mn(II), Mn(III), Ir(III), Rh(III), Ru(II), V(IV) or V(V); $M^3$ represents $M^1$ or $M^2$; A, D and E each represent an anion which may be the same or different; L represents an alcohol, aldehyde, ketone, ether, ester, amide, nitrile or sulfide or mixtures thereof; a and d are numbers to satisfy the valency state of $M^1$ and $M^2$ in the double metal cyanide part of the general formula; b and c are integers (b>c) which together with a and d provide the electroneutrality of the double metal cyanide part of the general formula; e is an integer satisfying the valency state of $M^3$; n and m are integers satisfying the electroneutrality of HE and w is a number between 0.1 and 4;
x is a number up to 20;
y is a number between 0.1 and 6; and
z is a number up to 5, and (2) at least (a) one or more salts composed of at least bivalent metal ions and metal-free anions, having a solubility in water of at least 1 g/100 ml at 25° C., and/or (b) one or more non-metal containing acids of which a 0.1N solution in water at 25° C. has a pH not exceeding 3.

2. The process of claim 1 wherein one or more salts are composed of at least bivalent metal ions and metal-free anions, having a solubility in water of at least 1 g/100 ml at 25° C.

3. The process of claim 1 wherein the salts are hexafluoro silicates or sulfates.

4. The process of claim 1 wherein the salts comprise oxygen-containing anions and one or more of the polyvalent metal ions selected from the group consisting of Ce(IV), Co(II), Sn(IV), $VO^{2+}$, Cu(II), $Mg^{2+}$, $Al^{3+}$, Zn(II), Th(IV), Fe(III), and $TiO^{2+}$.

5. The process of claim 1 wherein the salts comprise a hydrate of at least a salt of (a).

6. The process of claim 5 wherein the hydrate is $ZnSo_4.7H_2O$.

7. The process of claim 1 wherein the salt is derived from hydrochloric acid, hydrobromic acid, phosphoric acid or sulfuric acid.

8. The process of claim 7 wherein the acid is sulfuric acid.

9. The process of claim 1 wherein the salt or salts are composed of at least bivalent metal ions and oxygen-containing metal-free anions, having a solubility in water of at least 1 g/100 ml at 25° C. together with hydrochloric acid, hydrobromic acid, phosphoric acid or sulfuric acid.

10. The process of claim 9 wherein the salt is made of $ZnSo_4.7H_2O$ and hydrochloric acid or sulfuric acid.

11. The process of claim 1 wherein the double metal cyanide-type complex and the compound (a) and/or (b) is used in a molar ratio in the range of from 10 to 0.1.

12. The process of claim 1 wherein the complex has the general formula:

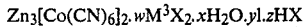

$Zn_3[Co(CN)_6]_2 \cdot wM^3X_2 \cdot xH_2O \cdot yL \cdot zHX$ wherein X represents a halide; $M^3$ represents Zn(II), Co(II), or Fe(II); L represents an alcohol, ether or ester;

w is a number between 0.7 and 1.5;
x is a number between 2 and 10;
y is a number between 1.5 and 3; and
z is a number between 0.15 and 1.5.

13. The process of claim 1 wherein the complex has been obtained by reacting a compound according to the general formula

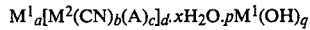

$M^1_a[M^2(CN)_b(A)_c]_d \cdot xH_2O \cdot pM^1(OH)_q$ wherein $M^1$, $M^2$, a, b, c, d and x are as defined in claim 12; p is a number between 0.1 and 4 and q is an integer satisfying the valency state of $M^1$ with at least the stoichiometric amount required for converting the hydroxyl groups present of a compound $H_nE_m$, wherein H, E, n and m are as defined in claim 12, preferably in the presence of water and/or an organic ligand L.

14. The process of claim 1 wherein the complex has been obtained by reacting a compound according to the general formula

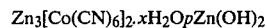

$Zn_3[Co(CN)_6]_2 \cdot xH_2O \cdot pZn(OH)_2$ wherein x and p are as defined in claim 13 with at least the stoichiometric amount required for converting the hydroxyl groups present of an inorganic acid HX wherein X represents a halide, preferably in the presence of water and/or an appropriate organic ligand L.

15. The process of claim 14 wherein a heat treatment is carried out on the reactants at a temperature between 40° C. and 120° C.

16. The process of claim 12 wherein use is made of calcium hexacyano cobaltate as a starting material for the preparation of the complexes.

17. The process of claim 16 wherein the compounds containing (a) and/or (b) are prepared in one step from calcium hexacyano cobaltate, aluminum hexacyano cobaltate or magnesium hexacyano cobaltate.

18. The process of claim 1 wherein an initiator selected from the group consisting of an alkanol and a propoxylated glycerol having a molecular weight between 200 and 2000 is additionally employed.

* * * * *